United States Patent [19]

Hervin

[11] Patent Number: 5,742,755
[45] Date of Patent: Apr. 21, 1998

[54] ERROR-HANDLING CIRCUIT AND METHOD FOR MEMORY ADDRESS ALIGNMENT DOUBLE FAULT

[75] Inventor: Mark W. Hervin, Dallas, Tex.

[73] Assignee: Cyrix Corporation, Richardson, Tex.

[21] Appl. No.: 603,999

[22] Filed: Feb. 20, 1996

[51] Int. Cl.[6] ............................. G06F 11/00; G06F 12/00
[52] U.S. Cl. .................................. 395/185.06; 395/421.1
[58] Field of Search ............................... 395/411, 421.1, 395/380, 185.06, 185.01, 185.03, 800

[56] References Cited

U.S. PATENT DOCUMENTS 5,517,657  5/1996  Rodgers ................................ 395/800
5,596,717  1/1997  Marshall, Jr. ....................... 395/185.06

Primary Examiner—Tod R. Swann
Assistant Examiner—J. Peikari
Attorney, Agent, or Firm—Andrew S. Viger; John L. Maxin

[57] ABSTRACT

In an $\chi$86-compatible processor capable of operating in a protected mode of operation in which privilege levels are assigned to tasks executing therein, an application task being assigned a lowest privilege level and executable in the processor to cause the processor to calculate addresses corresponding to specific locations in a computer memory associated with the processor, the addresses to be in alignment with respect to the computer memory prior to the processor issuing the addresses, a circuit for, and method of, handling sequential alignment faults and a computer system embodying the same. The circuit includes: (1) an alignment detection circuit to detect an alignment fault and generate an alignment check exception in response thereto and (2) an alignment fault-handling routine associated with the processor, executable in response to generation of the alignment check exception, operable to detect a sequential alignment fault and generate a double fault exception in response thereto, the alignment fault-handling routine thereby allowing the processor to avoid a third sequential alignment fault.

20 Claims, 5 Drawing Sheets

ERROR-HANDLING CIRCUIT AND METHOD FOR MEMORY ADDRESS ALIGNMENT DOUBLE FAULT

CROSS-REFERENCE TO RELATED APPLICATION

The present application is related to U.S. patent application Ser No. 08/138,789, filed Oct. 18, 1993, entitled "Microprocessor Pipe Control and Register Translation," commonly assigned with the present invention and incorporated herein by reference.

TECHNICAL FIELD OF THE INVENTION

The present invention is directed, in general, to computing systems and, more specifically, to a circuit and method for handling double faults related to misaligned memory addresses that may be calculated during execution of an application program in an $\chi 86$-compatible processor.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline, the processing of one instruction completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

As described above, a pipelined processor includes processing stages. For instance, the pipeline may be divided into separate instruction fetch, instruction decode, address calculation, execution and write back stages. An exemplary implementation is described in detail in U.S. patent application Ser. No. 08/902,908, entitled "Microprocessor Pipe Control and Register Translation," and incorporated hereinabove by reference. The instruction fetch stage retrieves instructions from the computer's memory. The instruction decode stage decodes the instructions into one of a variety of groups. The address calculation stage may determine one or more system memory addresses or operands to be used by the instruction. The execution stage actually performs any arithmetic or logic operations that the instruction may require.

Each of the foregoing improvements in $\chi 86$-based processor architecture (e.g., pipelining, superpipelining, superscaling and combinations thereof) introduce features, improvements, enhancements, modifications or the like (collectively, referred to hereinafter using the broader term "changes") which, to be taken advantage of, require the introduction of cooperative changes into software developed for use therewith. Hundreds of trillions of dollars however have been invested in conventional software products. Therefore, while various changes are integrated into new processor architectures and associated software, it is desirable for new processor architectures to continue to support existing software (referred to hereinafter using the broader phrase "downward compatible" or "downward compatibility").

It has been found, however, processors adhering to the $\chi 86$-based architecture and operating in the protected mode appear, under some circumstances, to lock up while executing instructions with misaligned memory addresses. Memory addresses are misaligned when an access to memory is mismatched with respect to the structure of the data stored therein.

What is needed in the art is a determination of why a misaligned memory access by an application program should cause the processor to appear to freeze. Further, what is needed in the art, once the source of the problem is found, is a solution to the problem.

SUMMARY OF THE INVENTION

Supporting downward compatibility over time uncovers flaws in predecessor processor design that have gone unnoticed. One such flaw involves what may suitably be referred to as an "alignment check double fault." A "bug" has been found to exist in the 86χ architecture relating to multiple occurrences of address alignment check faults.

An alignment check fault occurs when an address associated with an access to system memory is misaligned with respect to the memory. To handle an alignment check fault, the χ86 architecture provides an alignment fault-handling routine (or "handler"). Execution of the alignment fault-handling routine however, under certain circumstances, may, itself, generate a second sequential alignment fault or a "double fault." An alignment check double fault therefore occurs when the processor, in response to the initial alignment check fault, attempts a second misaligned access to memory. This second alignment check fault may be followed by a series of subsequent alignment faults which will cause the processor to "hang" in an infinite loop.

It is, accordingly, an object of the present invention to provide a system and a method for handling sequential alignment check faults. In the attainment of this object, the present invention provides, in an χ86-compatible processor capable of operating in a protected mode of operation in which privilege levels are assigned to tasks executing therein, an application task being assigned a low privilege level and executable in the processor to cause the processor to calculate addresses corresponding to specific locations in a computer memory associated with the processor, the addresses to be in alignment with respect to the computer memory prior to the processor issuing the addresses, a circuit for, and method of, handling sequential alignment faults and a computer system embodying the same. The circuit includes: (1) an alignment detection circuit to detect an alignment fault and generate an alignment check exception in response thereto and (2) an alignment fault-handling routine within the processor, executable in response to generation of the alignment check exception, and including one of a suitable hardware or microcode instruction operable to detect two sequential alignment faults, or a subsequent alignment fault, and generate a double fault exception in response thereto, the suitable hardware or microcode instruction thereby allowing the processor to avoid the sequential alignment faults.

The present invention is the first to recognize that a potentially catastrophic bug exists in the χ86 architecture relating to address alignment faults (normally regarded as benign faults): according to the conventional fault-handling model of the χ86, an alignment fault-handling routine is called upon to handle the occurrence of a single alignment fault. However, under some circumstances, execution of the alignment fault-handling routine may, itself, generate a second sequential alignment fault (a double fault). Unfortunately, the fault-handling model does not then call for a separate double fault handling routine to come to the rescue. Rather, the alignment fault-handling routine is re-executed, resulting in yet a third misalignment being generated. This process repeats itself endlessly, the result being an endless loop, and an apparent locking-up of the system as a whole.

The present invention cures the bug by detecting sequential alignment faults and, in response to such occurrence, calling upon the conventional double fault handling routine to resolve the matter and thereby avoiding the endless loop.

In one embodiment of the present invention, the processor generates an externally-readable error code associated with the alignment check exception. Of course, the processor need not generate such error code, as some conventional processors' exceptions are handled completely internally to the processor, with no external indicium whatsoever, such as processor model no. M1 of Cyrix Corp. in Richardson, Tex.

In one embodiment of the present invention, the alignment fault-handling routine is embodied in a sequence of microcode instructions in a microcode memory of the processor. Alternatively, the alignment fault-handling routine may be embodied in hard-wired logic (a faster, but more complicated embodiment) or may exist in memory outside of, but accessible by, the processor.

In one embodiment of the present invention, the circuit further comprises a double fault handling routine executable in response to generation of the double fault exception. The double fault handling routine, conventional to the χ86 fault-handling model, resolves contributory faults and thereby allows the processor to avoid crashes.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like elements, and in which.

DETAILED DESCRIPTION

Figure 1A:
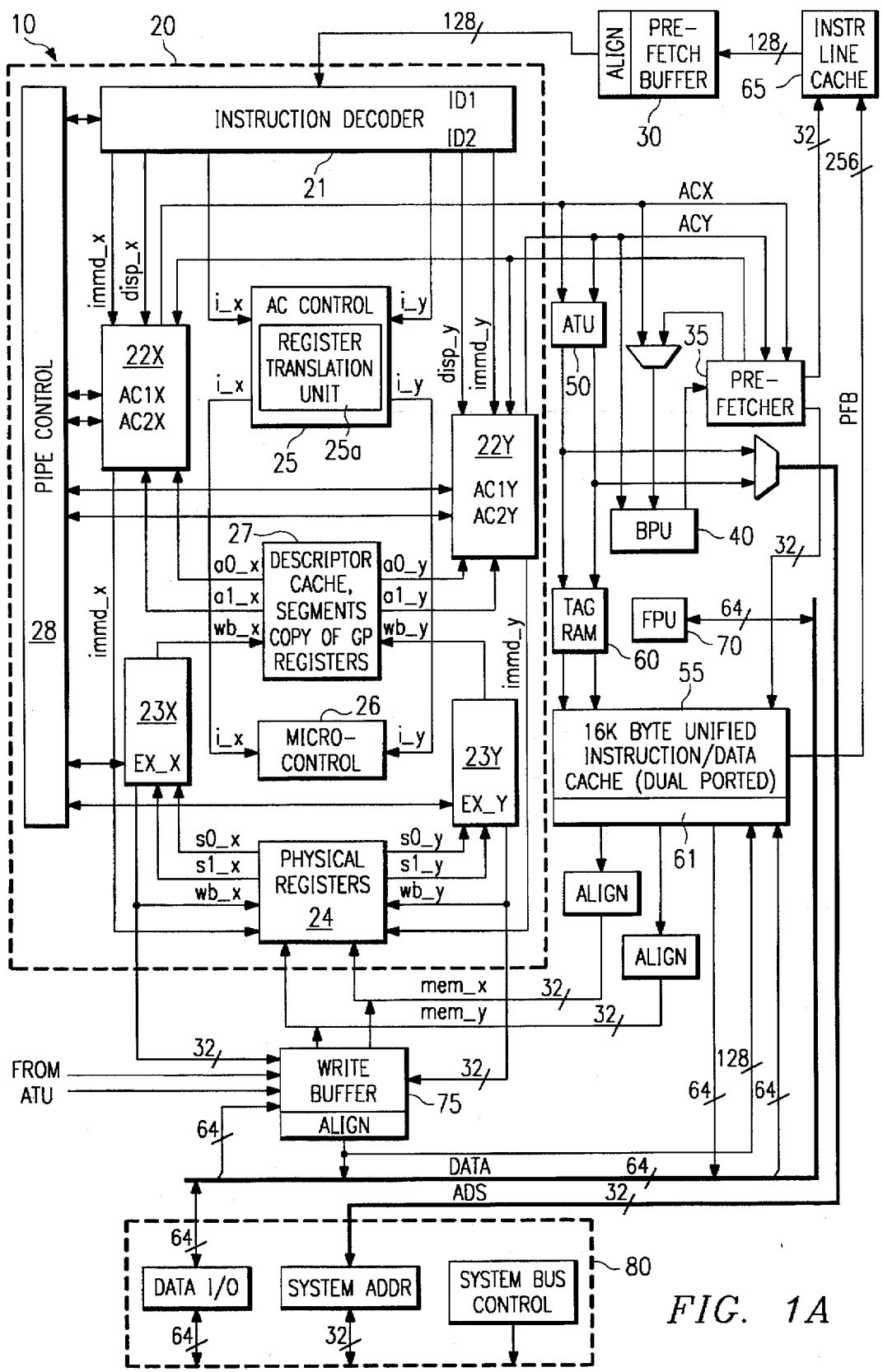
FIG. 1A illustrates a block diagram of an exemplary superscalar and superpipelined processor in accordance with the principles of the present invention.

Referring initially to FIG. 1A, illustrated is a block diagram of an exemplary superscalar and superpipelined processor 10 in accordance with the principles of the present invention. Exemplary processor 10 includes a processor core 20, a prefetch buffer 30, a prefetcher 35, a branch processing unit ("BPU") 40, an address translation unit ("ATU") 50, a unified cache 55, TAG random access memory ("TAG RAM") 60, an instruction line cache 65, an onboard floating point unit ("FPU") 70, a plurality of write buffers 75, and a bus interface unit ("BIU") 80. Each of the above-identified components is conventional, i.e., their functionality is known. The functionality associated with the interrelationship of various ones of the components is also known. Exemplary processors implementing the foregoing are available from Cyrix Corp. of Richardson, Tex. Cyrix Corp. manufactures the M1, M5, M6 and M7 processors.

In an exemplary embodiment, instruction line cache 65 and unified cache 55 respectively operate as primary and secondary instruction caches, each having a 32 byte line size. This implementation suitably reduces instruction fetches to unified cache 55. In a preferred embodiment, instruction line cache 65 may suitably be a 256 byte cache, while unified cache 55 may suitably be a 16 kilobyte ("Kbyte") code/data cache. Unified cache 55 may also suitably be associated with TAG RAM 60. "Associated with," as the phrase is used herein, means to include within, interconnect with, contain, be contained within, connect to, couple with, be communicable with, juxtapose, cooperate with, interleave or the like. In another exemplary embodiment, processor 10 may suitably use a 32-bit address bus ("ADB"), a 64-bit data bus ("DBS") and a 256 bit pre-fetch bus ("PFB"). The PFB corresponds to the 32 byte line sizes of unified cache 55 and instruction line cache 65, and suitably enables a full line of 32 instruction bytes to be transferred to instruction line cache 65 in a single clock cycle.

Unified cache 55 is preferably 4-way set associative, using a pseudo-least-recently-used ("LRU") replacement algorithm, with selectively alternative write-through and write-back modes. Unified cache 55 is multi-ported (through banking) to permit two memory accesses (e.g., data reads, instruction fetches or data writes) per clock cycle. Instruction line cache 65 is preferably a fully associative, look-aside implementation (relative to the unified cache 55), using an LRU replacement algorithm.

Turning momentarily to exemplary processor core 20, illustrated is a superscalar and superpipelined design having two exemplary execution pipelines, designated X and Y, and including an instruction decode ("ID") processing stage 21, two address calculation/operand access ("AC") processing stages, 22X and 22Y, two execution ("EX") processing stages, 23X and 23Y, and a register file 24 having 31 32-bit registers. Core 20 further includes an AC control processing stage 25, a microcontrol unit 26, a second register file 27 containing a descriptor cache, segment registers and a copy of the logical general purpose registers, and a pipe control unit 28.

Exemplary ID processing stage 21 is operative to decode a variable length χ86-based instruction set, and may suitably retrieve 16 bytes of instruction data from pre-fetch buffer 30 each clock cycle. Exemplary AC processing stages 22X and 22Y are each operative to perform address calculations for their respective execution pipelines. Exemplary EX processing stages 23X and 23Y are each operative to execute instructions within their respective execution pipelines. Exemplary register file 24 suitably includes 31 physical registers. Exemplary AC control processing stage 25, which includes a register translation unit 25a, and may further suitably include appropriately arranged register renaming hardware (not shown), is operative to control address calculations. Exemplary microcontrol unit 26, which may suitably include a microsequencer (not shown) and a micro-ROM (not shown), provides execution control. Again, exemplary second register file 27 may suitably include a descriptor cache, segment registers and a copy of the logical general purpose registers (i.e., as obtained from register file 24). Exemplary pipe control unit 28 is operative to control instruction flow through exemplary execution pipelines X and Y, whereby instruction order is maintained until pipe control unit 28 determines that a particular instruction will not cause an exception.

In an exemplary embodiment, register translation unit 25a has a capacity to map 32 physical registers to 8 logical registers. In the illustrated embodiment however, processor 10 includes only 31 physical registers, leaving register translation unit 25a with excess mapping capacity. Processor 10 may suitably use the excess mapping capacity by allowing register translation unit 25a to map to a physical register located other than register file 24. In the illustrated embodiment, the physical register may suitably be located in second register file 27, which is under control of AC control unit 25. In an alternate exemplary embodiment, pipe control unit 28 is further operative to remove bubbles from the instruction stream, i.e., "flushing", the execution pipelines behind branches that are mis-predicted and handling the execution of exception-causing instructions.

More particularly, BPU 40 suitably monitors speculative execution associated with branches or floating point instructions (i.e., execution of instructions speculatively issued after branches that may be mis-predicted or floating point instructions issued to FPU 70 that may fault after execution of speculatively-issued instructions). In the event that a branch is mis-predicted (a condition not known until the instruction reaches one of the execution or write-back processing stages for the branch) or a floating point instruction faults, the execution pipeline is repaired to the point of the mis-predicted or faulting instruction (i.e., the execution pipeline is "flushed" behind the instruction) and an associated instruction fetch is restarted. Pipeline repair is preferably accomplished by creating processor state checkpoints at each pipeline stage as a predicted branch or floating point instruction enters the same. For these check pointed instructions, all processor resources (e.g., programmer-visible registers, the instruction pointer and the condition code register) that may suitably be modified by succeeding speculatively-issued instructions are check pointed. If a check pointed branch is mis-predicted or a check pointed floating point instruction faults, the execution pipeline is flushed behind the check pointed instruction. In the case of floating point instructions, this typically results in the entire execution pipeline being flushed. However, for a mis-predicted branch, there may be a paired instruction in EX and two instructions in WB that are nonetheless allowed to complete.

In accordance with the illustrated embodiment, writes from processor core 20 may suitably be queued into write buffer 75. Write buffers 75 provide an interface for writes to unified cache 55, while non-cacheable writes proceed directly from write buffers 75 to an external memory (shown and described in conjunction with FIG. 2). Write buffer logic may suitably support optional read sourcing and write gathering. In an exemplary embodiment, write buffer 75 includes twelve 32-bit write buffers, and write buffer allocation is performed by AC control unit 25.

FPU 70 includes a load/store stage with 4-deep load and store queues, a conversion stage (32-bit to 80-bit extended format), and an execution stage. Loads are controlled by processor core 20, and cacheable stores are directed through write buffers 75 (i.e., write buffer 75 is preferably allocated for each floating point store operation).

Conventional χ86-based processor design is more fully described in 80x86. Architecture & Programming—Volume II: Architecture Reference, Rakesh K. Agarwal, Prentice-Hall, Inc. (1991); The Indispensable P.C. Hardware Book, by Hans-Peter Messmer, Addisons-Wesley (2nd ed. 1995); and Pentium® Processor Family Developer's Manual—Volume 3: Architecture and Programming Manual, INTEL® (1995), each of which is incorporated herein by reference.

Figure 1B:
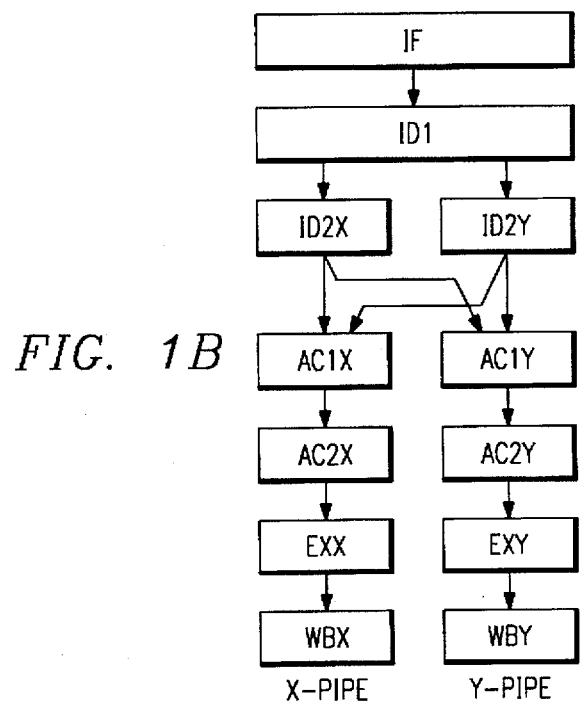
FIG. 1B illustrates a block diagram of an exemplary seven pipelined stage processor, including X and Y execution pipelines.

Turning to FIG. 1B, illustrated is a more detailed block diagram of seven exemplary pipelined processing stages of processor 10 of FIG. 1A, including X and Y execution pipelines. As before, each of the X and Y execution pipelines includes IF, ID1, ID2, AC1, AC2, EX and WB processing stages. The discussion of FIG. 1B is undertaken with reference to FIG. 1B.

Exemplary IF processing stage provides a continuous instruction code stream into processor core 20. Prefetcher 35 is operative to fetch 16 bytes of instruction data into prefetch buffer 30 from either instruction line cache 65 or unified cache 55. BPU 40 is accessed with the prefetch address, and supplies target addresses to prefetcher 35 for predicted changes of flow, allowing prefetcher 35 to shift to a new code stream in a single clock cycle.

Exemplary decode processing stages ID1 and ID2 decode a variable length χ86-based instruction set. Instruction decoder 21 retrieves 16 bytes of instruction data from prefetch buffer 30 each clock cycle. In ID1, the length of two instructions is decoded (one each for the X and Y execution pipelines) to obtain X and Y instruction pointers, a corresponding X and Y bytes-used signal is returned to prefetch buffer 30 which subsequently increments for the next 16 byte transfer. Also in ID1, certain instruction types are determined, such as changes of flow, and immediate or displacement operands are separated. In ID2, the decoding of X and Y instructions is completed, generating entry points for "microROM" and decoding addressing modes and register fields.

The optimum pipeline, X or Y, for executing an instruction is suitably determined during the ID processing stages, causing the instruction to be issued into that pipeline. In an exemplary embodiment, circuitry is provided for pipeline switching which suitably enables instructions to be switched from ID2X to AC1Y and from ID2Y to AC1X, as certain instructions (e.g., change of flow, floating point, exclusive or other like instructions) may only be issued in one of the two pipelines.

"Exclusive instructions," as the phrase is used herein, include any instructions that may fault within the EX pipeline processing stage, as well as certain instruction types, such as protected mode segment loads, string, special register access (control, debug, test, etc.), Multiply/Divide, Input/Output, PUSHA/POPA (PUSH all/POP all), task switch and the like. Exclusive instructions may suitably use the resources of both execution pipelines, exclusive instructions are preferably issued alone from the ID processing stage.

Exemplary address calculation/operand access processing stages AC1 and AC2 calculate addresses for memory references and supply memory operands. During AC1 two 32 bit linear (three operand) addresses are preferably calculated per clock cycle. Data dependencies are checked and resolved using register translation unit 25a and the 31 physical registers in register file 24 are advantageously used to map eight general purpose, programmer-visible logical registers in accordance with χ86-based architecture, namely: EAX, EBX, ECX, EDX, EDI, ESI, EBP and ESP. During AC2, register file 24 and unified cache 55 are accessed with the physical address. For cache hits, cache access time for multi-ported, unified cache 55 is the same as that of a register, effectively extending the register set. The physical address is either the linear address, or if address translation is enabled, a translated address generated by ATU 50.

The AC processing stage preferably includes eight logical, or architectural, registers, representing the χ86-based register set. In a preferred embodiment, the logical register corresponding to the stackpointer ("ESP") contains the actual stackpointer (instead of simply a copy thereof) when control of the stackpointer is allocated to AC1. If an instruction requires one or more address calculations, AC1 is operative to wait until the required data of the logical registers are valid before accessing those registers. During AC2, operands are obtained by accessing register file 24, and unified cache 55, with the physical address. The physical address therefore is preferably either the linear address, or if address translation is enabled, a translated address generated by ATU 50.

Exemplary ATU 50 is operative to generate translated addresses, preferably using a suitable translation lookaside buffer ("TLB") or the like, from the linear address using information from page tables in memory and local workspace control registers. Unified cache 55 is virtually indexed and physically tagged to permit, when address translation is enabled, set selection with the untranslated address (available at the end of AC1) and, for each set, tag comparison with the translated address from ATU 50 (available early in AC2). In the illustrated embodiment, segmentation or address translation violation checks are suitably performed in AC2.

Instructions within a given instruction code stream are preferably kept in order until it is determined that out-of-order execution of the same will not cause an exception. This determination may suitably be made during or before AC2, although floating point and certain exclusive instructions may suitably cause exceptions during execution. Instructions are passed from AC2 to EX (floating point instructions are passed to FPU 70). Instructions spend a variable number of clock cycles in EX as many of the same may execute out of order. Integer instructions may cause exceptions in EX, they are therefore designated as exclusive and issued alone into both execution pipelines, thereby ensuring that exceptions are handled in order.

Exemplary execution processing stages EX X and EX Y suitably perform the operations defined by a given instruction using one or more of adder, logic, shifter, etc. functional units. The EX X execution processing stage may also include multiplication and division hardware.

Exemplary write back processing stage ("WB") updates register file 24, condition codes, as well as other parts of an suitable associated processing system with the results of the previously executed instruction. Typically, register file 24 is written in phase 1 ("PH1") of WB and read in phase 2 ("PH2") of AC2.

Additional disclosure of write buffers 75, speculative execution and the microsequencer may be found in Ser. No. 08/138,654, entitled "Control of Data for Speculative Execution and Exception Handling in a Processor with Write Buffer;" Ser. No. 08/911,430, entitled "Branch Processing Unit;" Ser. No. 08/732,872, entitled "Speculative Execution in a Pipelined Processor" and Ser. No. 08/138,855, entitled "Microprocessor Having Single Clock Instruction Decode Architecture", all of which are assigned to the assignee of the present invention and incorporated herein by reference for all purposes.

Figure 2:
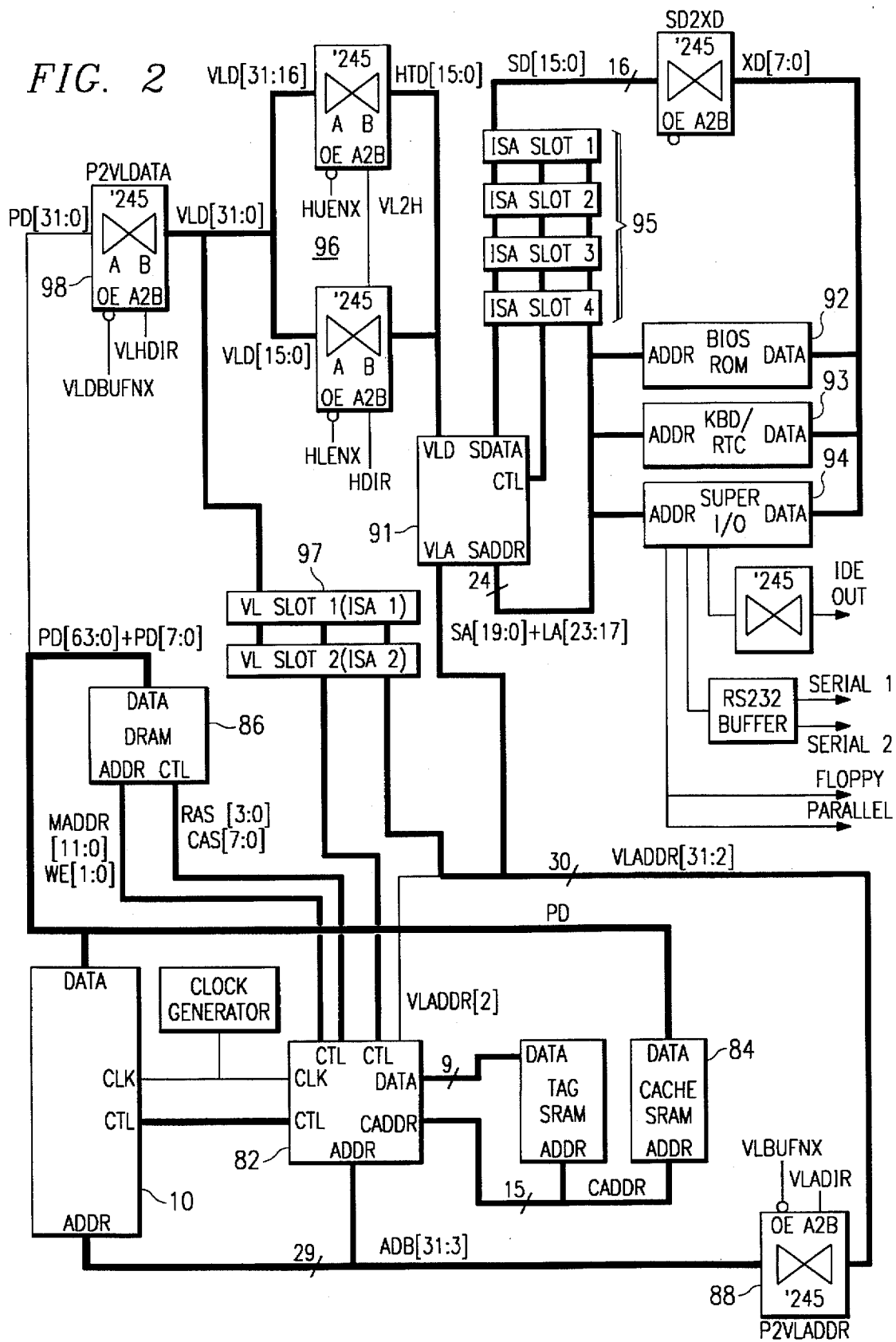
FIG. 2 illustrates a block diagram of an exemplary processor system.

Turning to FIG. 2, illustrated is an exemplary processor system design, in the form of a motherboard, that advantageously uses exemplary processor 10 of FIGS. 1A and 1B in cooperation with a single chip memory/bus controller 82. Controller 82 provides an interface between processor 10 and an external memory subsystem controlling data movement over DBS, the 64-bit processor data bus. The external memory subsystem includes level two cache 84 and main memory 86. In accordance with the illustrated embodiment, the data path may suitably be external to controller 82 thereby reducing its pin count and cost.

Controller 82 preferably interfaces with ADB, the 32-bit address bus, directly and includes a one bit wide data port (not shown) for reading and writing registers within controller 82. A bidirectional isolation buffer 88 is preferably provided as an address interface between processor 10 and a conventional video local bus ("VL-Bus") and a conventional industry standard architecture ("ISA") bus. Controller 82 provides control for VL-Bus and ISA bus interfaces. A VL/ISA interface chip 91 provides standard interfaces to an exemplary 32-bit VL-Bus and an exemplary 16-bit ISA bus. The ISA bus may suitable interface to a basic input/output system ("BIOS") 92, a keyboard controller 93, and an I/O chip 94, as well as standard ISA slots 95. The interface chip 91 preferably interfaces to the 32-bit VL-bus through a bidirectional 32/16 multiplexer 96 formed by multiple high/low word isolation buffers. The VL-Bus interfaces to standard VL-Bus slots 97, and through a bidirectional isolation buffer 98 to the low double word of PD.

Figure 3:
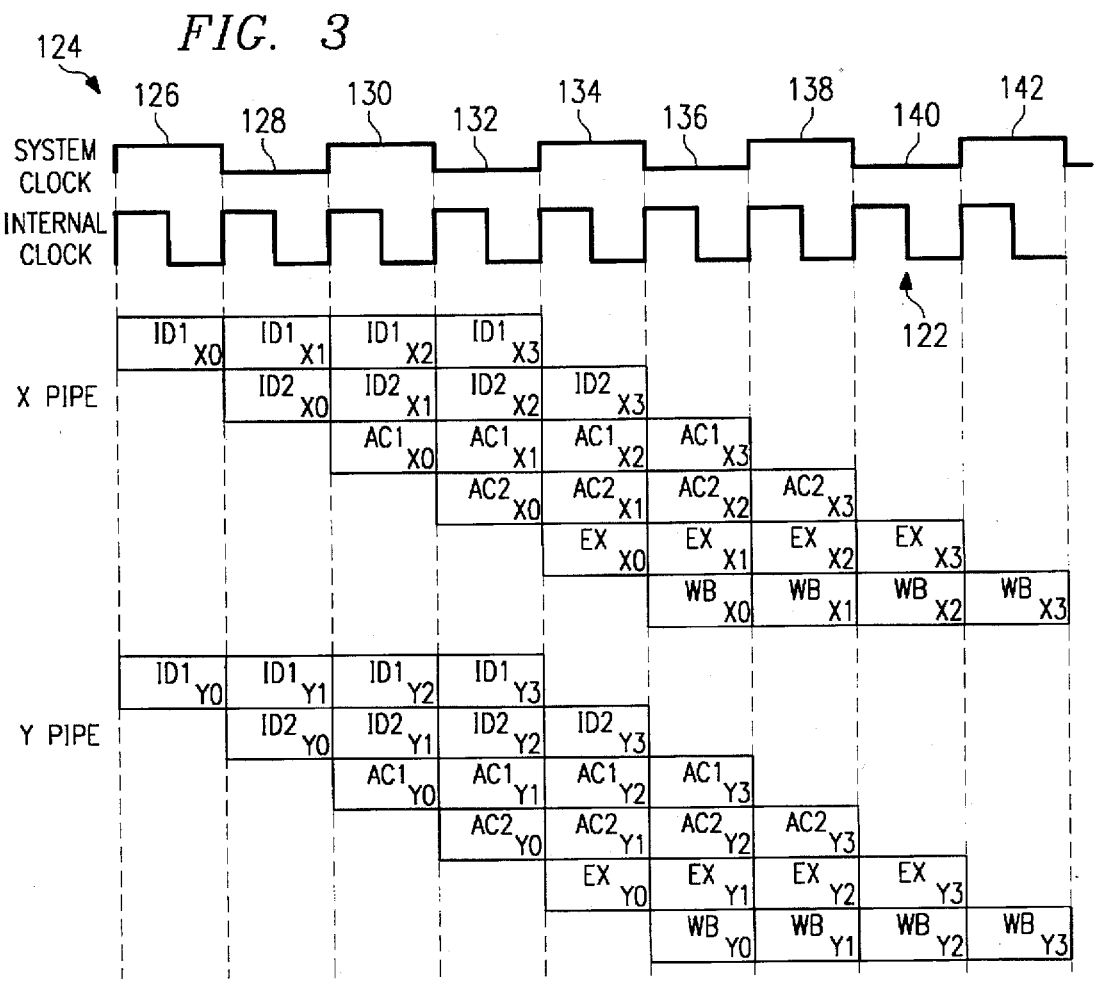
FIG. 3 illustrates an exemplary timing diagram demonstrating the flow of instructions through a pipeline unit in accordance with the exemplary processor of FIGS. 1a, 1b and 2.

Turning to FIG. 3, illustrated is an exemplary timing diagram demonstrating the flow of instructions through a pipeline in accordance with processor 10 of FIGS. 1A, 1B and 2. The timing diagram illustrates the flow of eight instructions through the pipeline, showing overlapping execution of instructions for a two pipeline architecture. Processor 10 preferably uses an internal clock 122 that is a multiple of a system clock 124. In the illustrated embodiment, internal clock 122 operates at twice the frequency of system clock 124.

During a first internal clock cycle 126, the ID1 processing stage operates respectively on instructions X0 and Y0. During internal clock cycle 128, instructions X0 and Y0 are in the ID2 processing stage (X0 being in ID2X and Y0 being in ID2Y) and instructions X1 and Y1 are in the ID1 processing stage. During internal clock cycle 130, instructions X2 and Y2 are in the ID1 processing stage, instructions X1 and Y1 are in the ID2 processing stage (X1 being in ID2X and Y1 being in ID2Y) and instructions X0 and Y0 are in the AC1 processing stage (X0 being in AC1X and Y0 being in AC1Y). During internal clock cycle 132, instructions X3 and Y3 are in the ID1 processing stage, instructions X2 and Y2 are in the ID2 processing stage, instructions X1 and Y1 are in the AC1 processing stage and instructions X0 and Y0 are in the AC2 processing stage.

The execution portion of each of the foregoing instructions is performed during sequential clock cycles, namely, clock cycles 134 to 140. This is an important aspect a pipelined architecture as the total instructions completed per clock cycle increases without reducing the execution time of individual instructions. Greater instruction throughput is thereby achieved without requiring greater demands on the speed of the hardware.

It should be noted that FIG. 3 illustrates an optimum condition, as no stage requires more than a single clock cycle. In actuality, however, one or more processing stages may suitably require additional clock cycles for completion, thereby changing instruction flow through the other pipeline stages. Further, instruction flow through one pipeline may suitably depend upon the flow of other instructions in the same or the other pipeline.

Many factors may cause delays. For example, a memory access may miss in a memory cache, thereby preventing data access in the time required to process the instruction in one clock cycle. This may require either, or both, sides of the EX stage to delay execution until the data is retrieved from main memory.

As another example, an instruction may require a hardware resource, such as a multiplier, that is only in one of the execution stages, such as EX in the X pipeline in the illustrated embodiment. In this case, the instruction must delay until the resource is available.

As a further example, consider data dependencies, that may also cause delays. If an instruction needs the result from a previous instruction, such as an ADD, it must wait until that instruction is processed by the execution stage.

Other delays are caused by "multi-box" instructions (instructions implemented using multiple microinstructions) requiring more than one clock cycle in the EX pipeline stage to complete. These instructions stop subsequent instruction flow through the pipeline at the output of the ID2 stage.

Instruction flow through the pipeline is controlled by the pipe control unit 28. In a preferred embodiment, a single pipe control unit 28 is used to control the flow of instructions through both (or all) of the pipelines. To control the flow of instructions through the pipelines, the pipe control unit 28 receives "delay" signals from the various stages comprising pipelines 102 and 104 and issues "stall" signals to the various stages. Note that although a single pipe control unit 28 is used for both X and Y pipelines, the pipelines themselves are controlled independent of one another. In other words, a stall in the X pipeline does not necessarily cause a stall in the Y pipeline. Note further that additional pipelines or additional stages for each pipeline may suitably be provided in accordance with alternate embodiments of the present invention.

As discussed hereinabove, improvements in $\chi$86-based processor architecture (e.g., pipelining, superpipelining, superscaling, combinations thereof, etc.) introduced changes to processor design, which require the introduction of cooperative changes in software developed for use therewith. While various changes are integrated into new processor architectures and associated software, it is desirable for new processor architectures to remain downward compatible, which overtime may uncover flaws in predecessor processor designs.

An "alignment-check fault" is an exception that may suitably be generated for attempted access to unaligned operands (e.g., a word stored at an odd byte address, a double word stored at an address which is not an integer multiple of four, etc.). In the 80286 architecture, a Protected Mode was introduced to protect the different tasks in a multitasking operating system (e.g., OS/2, Windows NT or UNIX) from invalid or incorrect memory accesses. The 80286, and its χ86-based successors, perform access checks using four different privilege levels.

In protected mode, the values in the six segment registers are suitably used as selectors into memory. Each selector is 16 bits long and is stored in a 16 bit segment register wherein the two least significant bits represent the Requested Privilege Level ("RPL") that a program may access a segment from. The RPL is used during the access check of the protected mode, typically by comparing the same with the Current Privilege Level ("CPL") of the currently active program. A privilege level ("PL") less than or equal to 2 is operating system-based (e.g., PL=0 denotes kernel, PL=1 denotes drivers, and PL=2 denotes operating system extensions), whereas a PL equal to 3 denotes an application program.

More generally, an exception is an interrupt issued by a processor in response to an internal processor error. Exceptions occur during the course of an instruction's execution. The conditions under which an exception occurs is typically part of the instruction's description. This description may suitably use one of the following χ86-based routines to signal that exception occurrence:

1. signal_fault(int vecnum, WORD error_code);
2. signal_trap(int vecnum, WORD error_code);
3. signal_imprecise(int vecnum, WORD error_code); and
4. signal_abort(int vecnum, WORD error_code).

Note that each of the above-identified routines has the same specification, namely, each uses the number specified by the vecnum parameter to index into the interrupt vector.

χ86-based architectures categorize exceptions in two groups, namely, benign and contributory. A "benign exception," as the phrase is used herein is an inappropriate, incorrect, illegal or other occurrence or event, perhaps caused by normal instruction processing, e.g., a BOUND instruction. A "contributory exception," as the term is used herein, is a more catastrophic occurrence or event indicating that a currently executing program is in jeopardy, which typically signals a structural failure in the operating system software if the same occurs more than once. In the event that two contributory exceptions occur in sequence, rather than service the second such exception via its exception handler, the processor signals a special conventional exception called a "double fault."

Figure 4A:
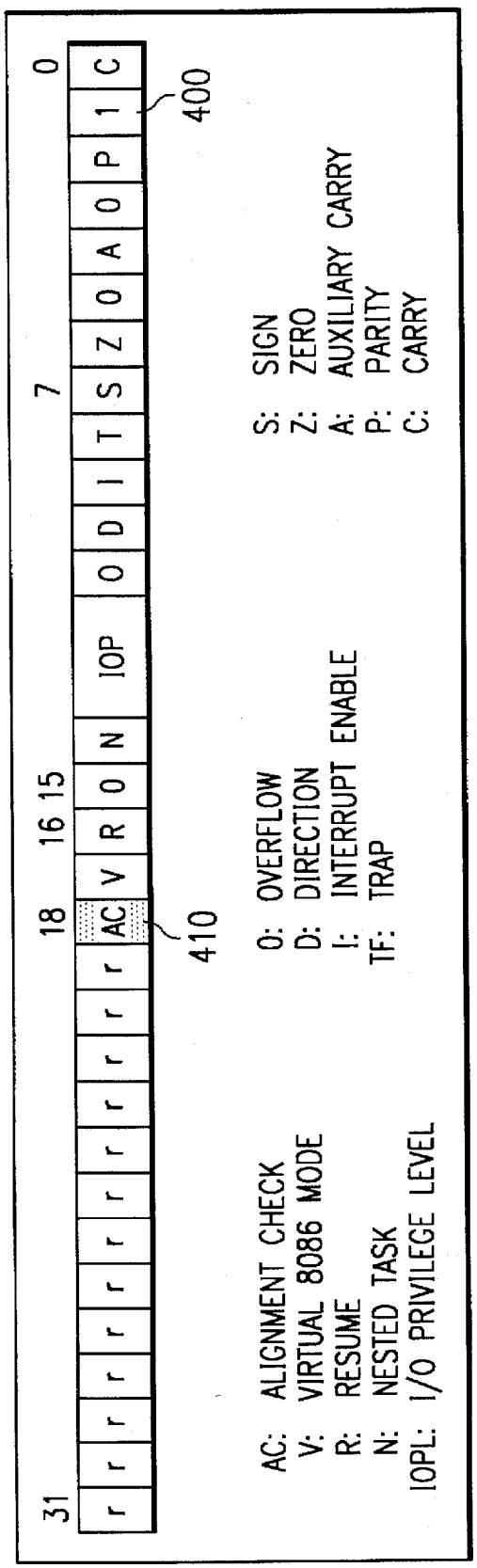
FIG. 4A illustrates a diagram of an exemplary flag register of the exemplary processor of FIGS. 1A, 1B and 2 containing an alignment check ("AC") bit.

Turning now to FIG. 4A, illustrated is a diagram of an exemplary flag register (generally designated 400) of processor 10 of FIGS. 1A, 1B and 2 containing an alignment check ("AC") bit 410. The alignment check was implemented so that misaligned accesses to memory may suitably be identified. If AC flag 410 is set, processor 10 generates an exception and a corresponding interrupt 17 if an alignment error occurs. In the illustrated embodiment an Alignment Check Mask ("AM") is also conventionally cooperatively used. The alignment check only affects programs with PL=3, a misalignment in programs with PL≦2 is ignored. Alignment errors typically occur with word accesses to uneven addresses, double word accesses to addresses that are not a multiple of four, and eight byte accesses to addresses that are not multiples of eight.

Figure 4B:
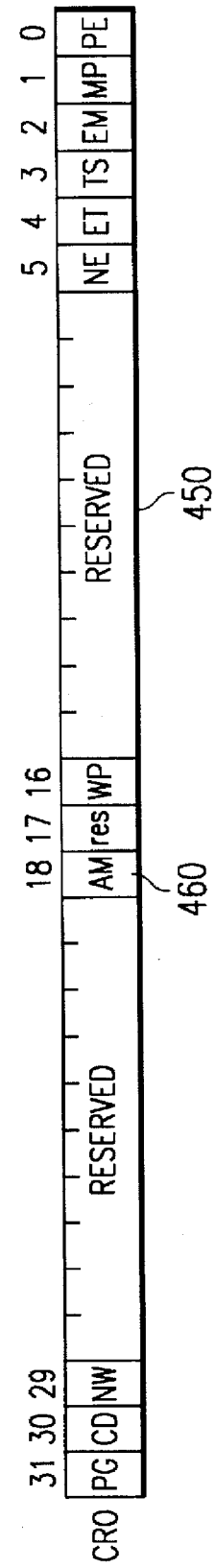
FIG. 4B illustrates a diagram of an exemplary control register of the exemplary processor of FIGS. 1A, 1B and 2 containing an Alignment Check Mask ("AM") bit.

Turning now to FIG. 4B, illustrated is a diagram of an exemplary control register (generally designated 450) of processor 10 of FIGS. 1A, 1B and 2 containing an AM bit 460. With AM bit 460 it is possible to define whether AC bit 410 in the Eflag register 400 may suitably issue an alignment exception. A set AM bit 460 allows exceptions, while a cleared AM bit 460 masks AC flag 410, thus AM bit 460 has a higher priority than AC flag 450.

To summarize, alignment checking in accordance with the illustrated embodiment is enabled if the following conditions are met:
1. AM bit 460 is set;
2. AC bit 410 is set; and
3. CPL is 3.

TABLE 1 lists conventional χ86 alignment requirements by data type.

TABLE 1

| Data Type | Address Must Be Divisible By |
| --- | --- |
| WORD | 2 |
| DWORD | 4 |
| Short REAL | 4 |
| Long REAL | 8 |
| TEMPREAL | 8 |
| Selector | 2 |
| 48-bit Segmented Pointer | 4 |
| 32-bit Flat Pointer | 4 |
| 32-bit Segmented Pointer | 2 |
| 48-bit "Pseudo-Descriptor" | 4 |
| FSTENV/FLDENV save area | 4 or 2, depending on operand size |
| FSAVE/FRSTOR save area | 4 or 2, depending on operand size |
| Bit String | 4 |

Figure 5:
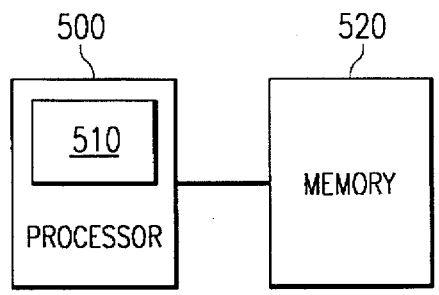
FIG. 5 illustrates a block diagram of a circuit for handling sequential alignment faults according to the present invention.

Turning now to FIG. 5, illustrated is a high level block diagram of exemplary processing circuitry (generally designated 500), such as processor 10 of FIGS. 1A and 1B, for handling sequential alignment-check faults according to the present invention. It is assumed that processing circuitry 500 is capable of operating in a protected mode of operation in which PLs may suitably be assigned to tasks executing therein. It is further assumed that an application task may suitably be assigned a lowest privilege level, such as PL=3 as described hereinabove, and that the application task may suitably be executable within processing circuitry 500, such as within processor core 20 of FIG. 1, for example.

During execution of the application task, processing circuitry 500 and, more particularly, address calculation circuitry 510 (e.g., address calculation/operand access stages AC1X, AC2X, AC1Y and AC2Y, in cooperation with AC Control 25) is suitably operative to calculate addresses corresponding to specific locations in a computer memory 520, such as main memory 86 of FIG. 2, for example, associated with processing circuitry 500.

According to the illustrated embodiment, the calculated addresses are typically in alignment with respect to computer memory 520 prior to issuing the addresses. If the calculated addresses are misaligned address calculation circuitry 510 is operative to issue an alignment-check fault and, in suitable circumstances, to handle sequential alignment-check faults. Under some circumstances, execution of a conventional χ86-based alignment fault-handling routine may, itself, generate a sequential alignment fault (i.e., a double fault). Subsequent alignment-check faults may occur, for example, while attempting to load and execute alignment fault-handling microcode in response to a preceding alignment check fault. Address calculation circuitry 510 is further operative to detect a subsequent alignment fault and, in response to such occurrence, processing circuity 500 is operative to call the conventional double fault handling routine to resolve the same.

Figure 6:
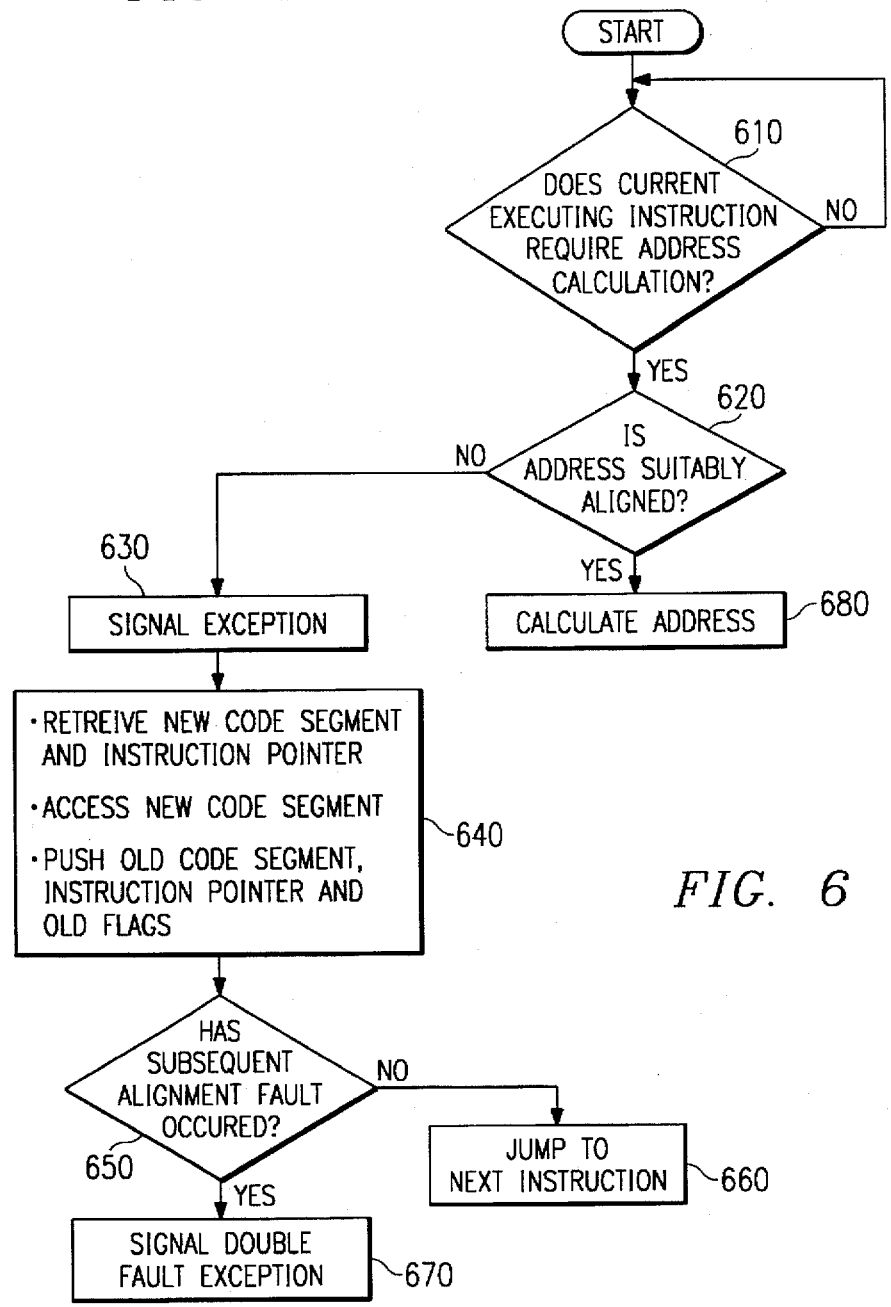
FIG. 6 illustrates a flow diagram of a method of handling sequential alignment faults according to the present invention.

Turning now to FIG. 6, which assumes that alignment checking is enabled, illustrated is a flow diagram of an exemplary method of handling sequential alignment faults according to the present invention. For illustrative purposes only, the discussion of FIG. 6 is undertaken with reference to FIG. 5. It is again assumed that a task is executing in processing circuitry 500 and that the task is capable of operating in a protected mode of operation and having a PL=3 according to χ86-based architectures (e.g., that may suitably and conventionally be determined using Eflag register 400 of FIG. 4A and control register 450 of FIG. 4B).

Processing circuitry 500 is suitably operative to determine if a currently executing instruction requires an address calculation corresponding to specific locations in computer memory 520 (decisional step 610). Address calculation circuitry 510, in response thereto (YES branch of decisional step 610), determines whether the address is suitably aligned with respect to computer memory 520 prior to issuing any associated address request (decisional step 620).

If the address is misaligned (YES branch of decisional step 620), then address calculation circuitry 510 is operative to signal the occurrence of an exception, namely, interrupt 17, indicating an alignment check-fault (process block 630). According to χ86-based architecture, processing circuitry 500 is suitably operative to execute the fault handling microcode, and more particularly, to:

1. access a conventional interrupt descriptor table ("IDT") in memory 520 to retrieve a new code segment ("CS") and instruction pointer ("EIP");
2. access the new CS; and
3. write out, or "push," "old" flags, CS, EIP, and, optionally, current error code to thereby load a suitable stack (process block 640). Address calculation circuitry 510 determines whether a subsequent alignment check-fault occurred during the execution of process block 640 (decisional block 650), i.e., whether any address associated with loading the exception handler was misaligned with respect to computer memory 520. In the illustrated embodiment, the subsequent alignment check fault may suitably be caused by the above-described "pushes."

If a subsequent alignment check-fault has not occurred (NO branch of decisional block 650), then processing circuitry 500 is operative to jump to the next instruction to be executed (process step 660). If a subsequent alignment check-fault occurred (YES branch of decisional block 650), then processing circuitry 500 is operative to generate a double fault exception in response thereto (process block 670), thereby suitably avoiding the sequential alignment check-fault, the double exception preferably initiating a conventional double fault handling routine including χ86-based interrupt handling microcode. The double fault handling routine executable in response to generation of the double fault exception. The double fault handling routine, conventional to χ86-based fault-handling models, resolves contributory faults and thereby allows processing circuitry 500 to avoid "hangs" or infinite loops.

In accordance with the illustrated embodiment, an alignment fault-handling routine, that is executable in response to generation of the alignment check-fault exception, may suitably include one of an instruction or circuitry operable to detect a plurality of sequential alignment faults and generate a double fault exception in response thereto. According to this embodiment, the alignment fault-handling routine is embodied in a sequence of microcode instructions in memory, such as memory 520 of processing circuitry 500. Alternatively, the alignment fault-handling routine may suitably be embodied in hard-wired logic (typically a faster, but often more complicated embodiment).

In another exemplary embodiment, processing circuitry 500 is further operative to generate a conventional externally-readable error code associated with the alignment check exception. Note however that this implementation is not necessary as some conventional processors handle exceptions completely internally to processor 10, with no external indicium whatsoever.

From the above, it is apparent that the present invention provides, in an χ86-compatible processor capable of operating in a protected mode of operation in which privilege levels are assigned to tasks executing therein, an application task being assigned a lowest privilege level and executable in the processor to cause the processor to calculate addresses corresponding to specific locations in a computer memory associated with the processor, the processor requiring the addresses to be in-alignment with respect to the computer memory prior to issuing the addresses, a circuit for, and method of, handling sequential alignment faults and a computer system embodying the same. The circuit includes: (1) an alignment detection circuit to detect an alignment fault and generate an alignment check exception in response thereto and (2) an alignment fault-handling routine within the processor, executable in response to generation of the alignment check exception and including circuitry, either hardware or responsive to a microcode instruction, operable to detect sequential alignment faults and generate a double fault exception in response thereto, the instruction thereby allowing the processor to avoid a subsequent sequential alignment fault.

Although the present invention and its advantages have been described in detail, those skilled in the art should understand that they can make various changes, substitutions and alterations herein without departing from the spirit and scope of the invention in its broadest form.

What is claimed is:

1. In an χ86-compatible processor capable of operating in a protected mode of operation in which privilege levels are assigned to tasks executing therein, an application task being assigned a low privilege level and executable in said processor to cause said processor to calculate addresses corresponding to specific locations in a computer memory associated with said processor, said addresses to be in alignment with respect to said computer memory prior to said processor issuing said addresses, a circuit to handle sequential alignment faults, comprising:

an alignment detection circuit to detect an alignment fault and generate an alignment check exception in response thereto; and an alignment fault-handling routine associated with said processor, executable in response to generation of said alignment check exception, operable to detect a sequential alignment fault and generate a double fault exception in response thereto, said alignment fault-handling routine thereby allowing said processor to avoid said sequential alignment fault.

2. The circuit as recited in claim 1 wherein said processor generates an externally-readable error code associated with said alignment check exception.

3. The circuit as recited in claim 1 wherein said alignment fault-handling routine is embodied in a sequence of microcode instructions in a microcode memory of said processor.

4. The circuit as recited in claim 1 further comprising a double fault handling routine executable in response to generation of said double fault exception.

5. In an χ86-compatible processor capable of operating in a protected mode of operation in which privilege levels are assigned to tasks executing therein, an application task being assigned a low privilege level and executable in said processor to cause said processor to calculate addresses corresponding to specific locations in a computer memory associated with said processor, said addresses to be in alignment with respect to said computer memory prior to said processor issuing said addresses, a circuit to handle sequential alignment faults, comprising:

means for detecting an alignment fault and generating an alignment check exception in response thereto; and means for handling said alignment fault executable associated with said processor in response to generation of said alignment check exception, said handling means including means for detecting a sequential alignment fault and generating a double fault exception in response thereto, said handling means thereby allowing said processor to avoid said sequential alignment fault.

6. The circuit as recited in claim 5 wherein said processor generates an externally-readable error code associated with said alignment check exception.

7. The circuit as recited in claim 5 wherein said means for handling is embodied in a sequence of microcode instructions in microcode memory means of said processor.

8. The circuit as recited in claim 5 further comprising means for handling a double fault executable in response to generation of said double fault exception.

9. In an χ86-compatible processor capable of operating in a protected mode of operation in which privilege levels are assigned to tasks executing therein, an application task being assigned a low privilege level and executable in said processor to cause said processor to calculate addresses corresponding to specific locations in a computer memory associated with said processor, said addresses to be in alignment with respect to said computer memory prior to said processor issuing said addresses, a method of handling sequential alignment faults, comprising the steps of:

detecting an alignment fault and generating an alignment check exception in response thereto; and handling said alignment fault executable associated with said processor in response to generation of said alignment check exception, said step of handling including the steps of:

detecting a sequential alignment fault, and generating a double fault exception in response thereto, thereby allowing said processor to avoid said sequential alignment fault.

10. The method as recited in claim 9 further comprising the step of generating an externally-readable error code associated with said alignment check exception.

11. The method as recited in claim 9 wherein said step of handling comprises the step of executing a sequence of microcode instructions stored in a microcode memory of said processor.

12. The method as recited in claim 9 further comprising the step of handling a double fault executable in response to generation of said double fault exception.

13. A computer system, comprising:

(a) a pipelined, χ86-compatible processor having at least one execution pipeline for executing instructions, said execution pipeline including ID (decode), AC (address calculation), and EX (execution) processing stages, and capable of operating in a protected mode of operation in which privilege levels are assigned to tasks executing therein, an application task being assigned a low privilege level and executable in said processor to cause said processor to calculate addresses corresponding to specific locations in a computer memory associated with said processor, said addresses to be in alignment with respect to said computer memory prior to said processor issuing said addresses;

(b) system memory for storing instructions including instructions of said application task;

(c) said processor including instruction fetch logic that fetches instructions from said system memory; and (d) said processor further including a circuit to handle sequential alignment faults, comprising:

(i) an alignment detection circuit to detect an alignment fault and generate an alignment check exception in response thereto, and (ii) an alignment fault-handling routine associated with said processor, executable in response to generation of said alignment check exception, operable to detect a sequential alignment fault and generate a double fault exception in response thereto, said alignment fault-handling routine thereby allowing said processor to avoid said sequential alignment fault.

14. The system as recited in claim 13 wherein said processor generates an externally-readable error code associated with said alignment check exception.

15. The system as recited in claim 13 wherein said alignment fault-handling routine is embodied in a sequence of microcode instructions in a microcode memory of said processor.

16. The system as recited in claim 13 further comprising a double fault handling routine executable in response to generation of said double fault exception.

17. A method of operating a computer system, comprising the steps of:

(a) applying power to a pipelined, χ86-compatible processor having at least one execution pipeline for executing instructions, said execution pipeline including ID (decode), AC (address calculation), and EX (execution) processing stages, and capable of operating in a protected mode of operation in which privilege levels are assigned to tasks executing therein, an application task being assigned a lowest privilege level and executable in said processor to cause said processor to calculate addresses corresponding to specific locations in a computer memory associated with said processor, said addresses to be in alignment with respect to said computer memory prior to said processor issuing said addresses;

(b) storing instructions in system memory, said instructions including instructions of said application task;

(c) fetching instructions from said system memory; and (d) executing instructions in said processor, said processor further including a circuit to handle sequential alignment faults, comprising:

(i) an alignment detection circuit to detect an alignment fault and generate an alignment check exception in response thereto, and (ii) an alignment fault-handling routine associated with said processor, executable in response to generation of said alignment check exception, operable to detect a sequential alignment fault and generate a double fault exception in response thereto, said alignment fault-handling routine thereby allowing said processor to avoid said sequential alignment fault.

18. The method as recited in claim 17 further comprising the step of generating an externally-readable error code associated with said alignment check exception.

19. The method as recited in claim 17 wherein said step of handling comprises the step of executing a sequence of microcode instructions stored in a microcode memory of said processor.

20. The method as recited in claim 17 further comprising the step of handling a double fault executable in response to generation of said double fault exception.

* * * * *